(12) United States Patent
Shen et al.

(10) Patent No.: US 12,501,381 B2
(45) Date of Patent: *Dec. 16, 2025

(54) SSB TRANSMISSION INDICATION METHOD AND APPARATUS, TERMINAL, DEVICE, AND MEDIUM

(71) Applicant: VIVO MOBILE COMMUNICATION CO., LTD., Guangdong (CN)

(72) Inventors: Xiaodong Shen, Guangdong (CN); Kai Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/767,336

(22) Filed: Jul. 9, 2024

(65) Prior Publication Data

US 2024/0365258 A1    Oct. 31, 2024

Related U.S. Application Data

(63) Continuation of application No. 17/488,145, filed on Sep. 28, 2021, now Pat. No. 12,063,606, which is a (Continued)

(30) Foreign Application Priority Data

Mar. 29, 2019   (CN) .......................... 201910252522.3

(51) Int. Cl.
*H04W 56/00* (2009.01)
*H04W 72/21* (2023.01)
*H04W 72/23* (2023.01)

(52) U.S. Cl.
CPC ......... *H04W 56/001* (2013.01); *H04W 72/21* (2023.01); *H04W 72/23* (2023.01)

(58) Field of Classification Search
CPC ..... H04W 56/00; H04W 72/04; H04W 74/08; H04W 74/00; H04W 48/08; H04W 48/10;
(Continued)

(56) References Cited

U.S. PATENT DOCUMENTS 10,470,144 B2 * 11/2019 Kim .................. H04W 56/0015
10,638,437 B2 * 4/2020 Kim ..................... H04L 5/0007
(Continued)

FOREIGN PATENT DOCUMENTS

CN        105577339 A       5/2016
CN        108391314 A       8/2018
(Continued)

OTHER PUBLICATIONS

Huawei et al., "Discussion on the ASN.1 for the reference signals," 3GPP TSG-RAN WG2 Meeting 102, R2-1807963, pp. 1-4, (May 11, 2018).

(Continued)

*Primary Examiner* — Man U Phan
(74) *Attorney, Agent, or Firm* — BROOKS KUSHMAN P.C.

(57) ABSTRACT

An SSB transmission indication method and apparatus, a terminal, a device, and a medium. The method is applied to a terminal, and the method includes: receiving SSB transmission indication information, where the SSB transmission indication information is used to indicate a candidate time position of an SSB.

12 Claims, 5 Drawing Sheets

---

| Network device | | Terminal |

S101: Send SSB transmission indication information, where the SSB transmission indication information is used to indicate a candidate time position of an SSB

Related U.S. Application Data continuation of application No. PCT/CN2020/081692, filed on Mar. 27, 2020.

(58) Field of Classification Search
CPC ..... H04W 24/08; H04W 16/14; H04W 24/10; H04W 4/00; H04W 72/00; H04W 72/12; H04W 76/27; H04W 52/24; H04W 52/38; H04W 16/28; H04L 5/00; H04L 5/10; H04L 1/00; H04L 1/08
USPC ......................................................... 370/350
See application file for complete search history.

(56) References Cited

U.S. PATENT DOCUMENTS

| | | | |
|---|---|---|---|
| 10,912,050 B2* | 2/2021 | Kim | H04L 5/0051 |
| 11,310,771 B2* | 4/2022 | Harada | H04L 5/0094 |
| 11,558,833 B2* | 1/2023 | Wang | H04W 56/001 |
| 2019/0053281 A1 | 2/2019 | Åström et al. | |
| 2019/0215790 A1 | 7/2019 | Kim et al. | |
| 2020/0022185 A1 | 1/2020 | Luo et al. | |
| 2020/0163037 A1 | 5/2020 | Zheng et al. | |
| 2020/0329446 A1* | 10/2020 | Tang | H04W 56/001 |
| 2021/0007072 A1* | 1/2021 | Wu | H04W 72/53 |
| 2021/0022186 A1 | 1/2021 | Liu et al. | |
| 2021/0153250 A1 | 5/2021 | Jiang et al. | |
| 2021/0345314 A1 | 11/2021 | Li | |
| 2021/0400725 A1* | 12/2021 | Harada | H04L 5/0053 |
| 2022/0021500 A1* | 1/2022 | Harada | H04L 5/0053 |
| 2022/0095253 A1* | 3/2022 | Harada | H04W 56/00 |
| 2022/0124648 A1* | 4/2022 | Harada | H04W 72/23 |
| 2022/0210720 A1* | 6/2022 | Harada | H04L 5/0091 |
| 2022/0263618 A1* | 8/2022 | Harada | H04L 5/0048 |

FOREIGN PATENT DOCUMENTS

| | | |
|---|---|---|
| CN | 10866366 A | 10/2018 |
| CN | 109041199 A | 12/2018 |
| CN | 109121198 A | 1/2019 |
| CN | 109302739 A | 2/2019 |
| CN | 109309955 A | 2/2019 |
| CN | 109451585 A | 3/2019 |
| CN | 109496456 A | 3/2019 |
| CN | 110365438 A | 10/2019 |
| EP | 3457792 A | 3/2019 |
| KR | 20180136917 A | 12/2018 |
| WO | 2019028755 A1 | 2/2019 |
| WO | 2020/166043 A1 | 8/2020 |

OTHER PUBLICATIONS

Qualcomm Incorporated, "Maintenance for physical downlink control channel," 3GPP TSG RAN WG1 Meeting #94, R1-1809426, pp. 1-16, (Aug. 11, 2018).

NTT DOCOMO, Inc., "Maintenance for Downlink signals and channels," 3GPP TSG RAN WG1 Meeting #95, R.1-1813296, pp. 1-2, (Nov. 3, 2018).

NTT DOCOMO, Inc., "[draft] CR on PDSCH resource mapping," 3GPP TSG RAN WG1 Meeting #95, R1-1813296, pp. 1-2, (Nov. 3, 2018).

Qualcomm Incorporated, "Feature lead summery on initial access signals and channels for NR-U," 3GPP TSG RAN WG1 Meeting AH1901, R1-1901332, pp. 1-31, (Jan. 21, 2019).

Ericsson, "Correction of SIB1 parameter name," 3GPP TSG-RAN WG1 Meeting #96, R1-1902106, pp. 1-14, Feb. 15, 2019).

JP Office Action dated Nov. 1, 2022 as received in Application No. 2021-558002.

Chinese Office Action dated Oct. 27, 2020 as received in application No. 201910252522.3.

"Remaining issues on RACH procedure" 3GPP TSG RAN WG1 Meeting #93 R1-1806035 Busan, Korea, May 21-25, 2018, Vivo.

International Search Report and Written Opinion date Oct. 14, 2021 as received in application No. PCT/CN2020/081692.

"Discussion on physical DL channel design in unlicensed spectrum" 3GPP TSG RAN WG1 Meeting #94 R1-1808235 Gothenburg, Sweden, Aug. 20-24, 2018, Vivo.

Nokia et al., "Discrepancy in signaling ssb-PositionsInBurst," 3GPP TSG-RAN WG2 Meeting #102, R2-1806940, pp. 1-10, (May 11, 2018).

OPPO, "Enhancements to initial access procedure for NR-U," 3GPP TSG RAN WG1 #96, R1-1901923, pp. 1-7, (Feb. 25-Mar. 1, 2018).

"3rd Generation Partnership Project; Technical Specification Group Radio Access Network; NR; Physical layer procedures for control (Release 15)," 3GPP TS 38.213, V15.5.0, pp. 1-104, (Mar. 27, 2019).

KR Office Action dated Feb. 21, 2023 as received in Application No. 10-2021-7035376.

European Search Report dated May 10, 2022 as received in application No. 20784007.5.

"Summary on Maintenance related to rate-matching in NR" 3GPP TSG-RAN WG1 #96, R1-1903464, Feb. 25, 2019, Nokia.

Non-final Rejection for copending U.S. Appl. No. 17/488,145, mailed Nov. 28, 2023, 14 Pages.

* cited by examiner

--PRIOR ART--

SSB TRANSMISSION INDICATION METHOD AND APPARATUS, TERMINAL, DEVICE, AND MEDIUM

CROSS-REFERENCE TO RELATED APPLICATIONS

This application is a continuation of U.S. patent application Ser. No. 17/488,145 filed on Sep. 28, 2021, which has issued as U.S. Pat. No. 12,063,606; the U.S. patent application Ser. No. 17/488,145 is a continuation of PCT Application No. PCT/CN2020/081692 filed on Mar. 27, 2020, which claims priority to Chinese Patent Application No. 201910252522.3 filed on Mar. 29, 2019. The contents of the aforementioned applications are incorporated herein by reference in their entireties.

TECHNICAL FIELD

Some embodiments of this disclosure relate to the communications field, and in particular, to an SSB transmission indication method and apparatus, a terminal, a device, and a medium.

BACKGROUND

When a communications system operates on an unlicensed frequency band, before sending information, a terminal or network device needs to perform clear channel assessment (CCA) or extended clear channel assessment (eCCA), that is, energy detection (ED), to listen on a channel. When energy is lower than a specific threshold, the channel is determined to be clear. In this case, the terminal or network device may start transmission.

Because the unlicensed frequency band is shared by a plurality of technologies or a plurality of transmission nodes, this contention-based access manner results in uncertainty in channel available time. When a channel is available, a network-side signal transmission position in which a signal can be transmitted may have been missed, and consequently, the signal cannot be transmitted. In this case, a receive end may be unable to properly receive a signal configured by a network side, or may be unable to perform an action, for example, physical downlink control channel (PDCCH) monitoring, or radio environment monitoring and measurement, based on a network-side configuration after receiving a signal.

Therefore, in an unlicensed communications system, transmission can be performed only after clear channel assessment is performed. To ensure a probability of transmission, as shown in FIG. 1, a synchronization signal/physical broadcast channel block (SSB, which may also be directly referred to as an SS block for short, that is, a synchronization signal block) may be transmitted in different time positions. In a related technology, a time position in which an SSB is transmitted is known. However, when a time position in which an SSB is transmitted is unknown, how to indicate SSB transmission is a problem that needs to be resolved.

SUMMARY

Some embodiments of this disclosure provide an SSB transmission indication method.

According to a first aspect, some embodiments of this disclosure provide an SSB transmission indication method, applied to a terminal. The method includes:

receiving SSB transmission indication information, where the SSB transmission indication information is used to indicate a candidate time position of an SSB.

According to a second aspect, some embodiments of this disclosure provide an SSB transmission indication method, applied to a network device. The method includes:

sending SSB transmission indication information, where the SSB transmission indication information is used to indicate a candidate time position of an SSB.

According to a third aspect, some embodiments of this disclosure provide an SSB transmission indication apparatus, applied to a terminal. The apparatus includes:

an information receiving module, configured to receive SSB transmission indication information, where the SSB transmission indication information is used to indicate a candidate time position of an SSB.

According to a fourth aspect, some embodiments of this disclosure provide an SSB transmission indication apparatus, applied to a network device. The apparatus includes:

an information sending module, configured to send SSB transmission indication information, where the SSB transmission indication information is used to indicate a candidate time position of an SSB.

According to a fifth aspect, some embodiments of this disclosure provide a terminal. The terminal includes a processor, a memory, and a computer program stored in the memory and capable of running on the processor, where when the computer program is executed by the processor, the steps of the SSB transmission indication method are implemented.

According to a sixth aspect, some embodiments of this disclosure provide a network device. The network device includes a processor, a memory, and a computer program stored in the memory and capable of running on the processor, where when the computer program is executed by the processor, the steps of the SSB transmission indication method are implemented.

According to a seventh aspect, some embodiments of this disclosure provide a computer-readable storage medium. The computer-readable storage medium stores a computer program, and when the computer program is executed by the processor, the steps of the SSB transmission indication method are implemented.

In some embodiments of this disclosure, a candidate time position in which an SSB can be transmitted is indicated, thereby implementing indication of SSB transmission when a time position in which an SSB is transmitted is unknown.

BRIEF DESCRIPTION OF DRAWINGS

This disclosure can be better understood with the following description of specific embodiments of this disclosure that are described with reference to the accompanying drawings. Identical or similar reference numerals in the accompanying drawings represent identical or similar characteristics.

DETAILED DESCRIPTION

Figure 1:
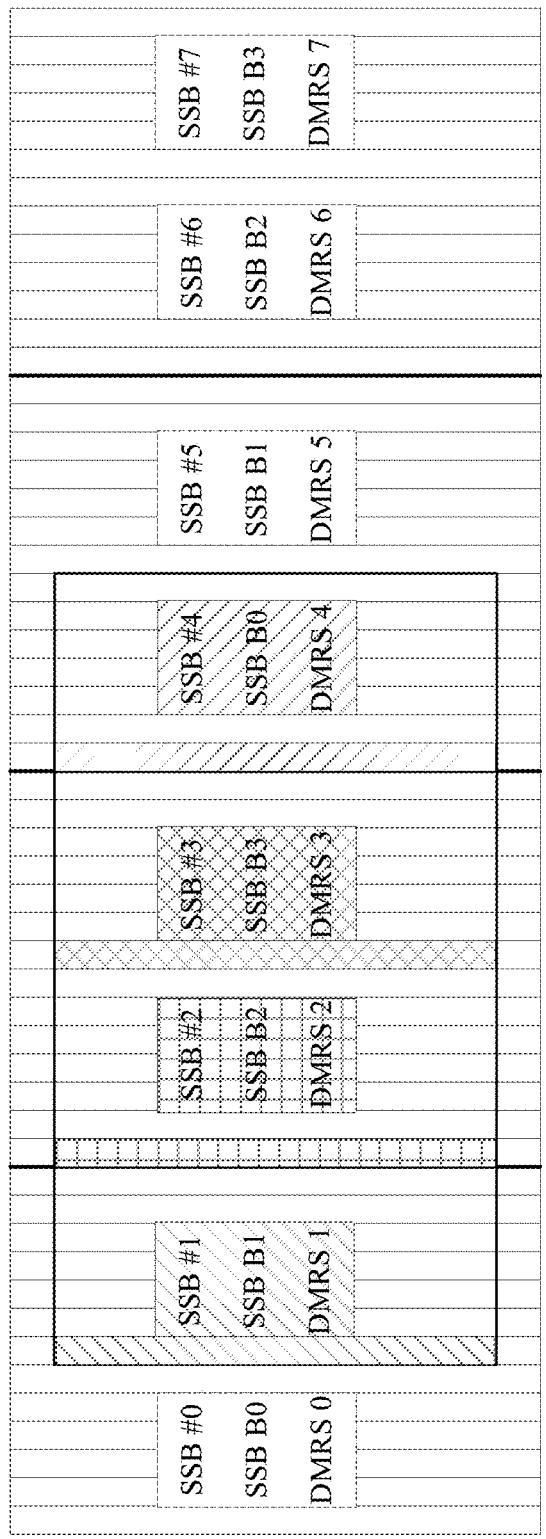
FIG. 1 is a schematic diagram of an SSB being transmitted in different time positions in a related technology.

The following clearly describes the technical solutions in some embodiments of this disclosure with reference to the accompanying drawings in some embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In new radio (NR) Rel 15, an SSB may be transmitted for a plurality of times in a half-frame, and numbered in chronological order. For a specific frequency and a specific subcarrier spacing, assuming that a candidate position of an SSB in a half-frame is known, a network device may select an SSB transmission position based on different circumstances. Therefore, a carrier on which an SSB is actually transmitted is indicated in a system information block (SIB) 1 and serving cell common configuration information (ServingCellConfigCommon), so that a terminal obtains information indicating that the SSB is transmitted on the carrier, and provides the information for the following procedures:

1. Rate matching: Rate matching is performed on the transmitted SSB based on the foregoing indication and downlink transmission information. The downlink transmission information includes but is not limited to: other system information (OSI), paging, random access response (RAR), and physical downlink shared channel (PDSCH).

2. Random access channel occasion (RO) mapping: A quantity N_tx_SSB of actually transmitted SSBs for which RO mapping needs to be performed is obtained based on the foregoing indication, and there is a mapping relationship between ROs and the actually transmitted SSBs. One RO may be mapped to a plurality of SSBs, and a quantity of SSBs to which one RO is mapped may be: {⅛, ¼, ½, 1, 2, 4, 8, 16}.

3. PDCCH monitoring: For a PDCCH candidate that is not in a type 0 PDCCH common search space set (Type 0 PDCCH CSS set), if at least one resource element (RE) of the PDCCH candidate overlaps a resource element of the indicated actually transmitted SSB, the terminal does not need to monitor the PDCCH candidate.

4. Physical uplink control channel (PUCCH) repetition transmission: The following two conditions are considered when a slot used for PUCCH repetition transmission is determined:

(1) A start symbol specified during PUCCH configuration is used as a first symbol if meeting the following condition: The start symbol is a configured UL symbol, or is a flexible symbol that does not overlap with a symbol of the indicated actually transmitted SSB.

(2) N consecutive symbols starting from the first symbol are all configured uplink symbols, where N may be determined by PUCCH configuration; or N consecutive symbols starting from the first symbol are N consecutive flexible symbols that do not overlap the indicated actually transmitted SSB.

The following describes SSB transmission. Unlicensed Rel 16, which is a new radio (NR) standard, stipulates that in an unlicensed communications system, transmission of an SSB/a PBCH, a type 0 PDCCH, and system information can be performed only after clear channel assessment is performed. To transmit these broadcast information more effectively, these signals are usually integrated in the unlicensed communications system, for example, a discovery reference signal (DRS). In this way, clear channel detection needs to be performed only once before all these signals are successfully transmitted. In addition, due to importance of these information, to ensure a probability of transmission of these information, a plurality of candidate positions need to be introduced in one transmission window, and SSBs in a same QCL beam direction may be transmitted in different time positions.

Figure 2:
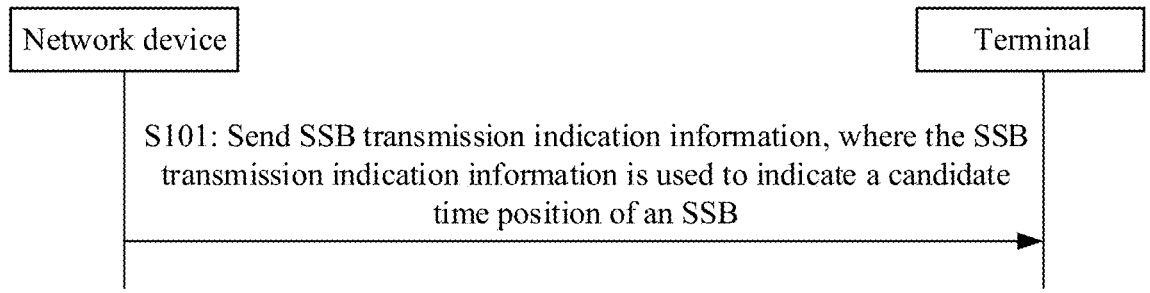
FIG. 2 is an interaction diagram of an SSB transmission indication method according to some embodiments of this disclosure.

FIG. 2 is an interaction diagram of an SSB transmission indication method according to some embodiments of this disclosure. As shown in FIG. 2, the SSB transmission indication method includes the following step:

S101: A network device sends SSB transmission indication information to a terminal, and the terminal receives the SSB transmission indication information, where the SSB transmission indication information is used to indicate a candidate time position of an SSB, that is, indicate a candidate time position in which an SSB can be transmitted.

The SSB transmission indication information includes a bitmap, and a value of a bit in the bitmap includes a first value and/or a second value. A candidate time position in which an SSB can be transmitted is indicated by using the bitmap.

In some embodiments of this disclosure, a candidate time position in which an SSB can be transmitted is indicated, thereby implementing indication of SSB transmission, and resolving a problem that SSB transmission cannot be indicated when a time position in which an SSB is transmitted is unknown.

Figure 3:
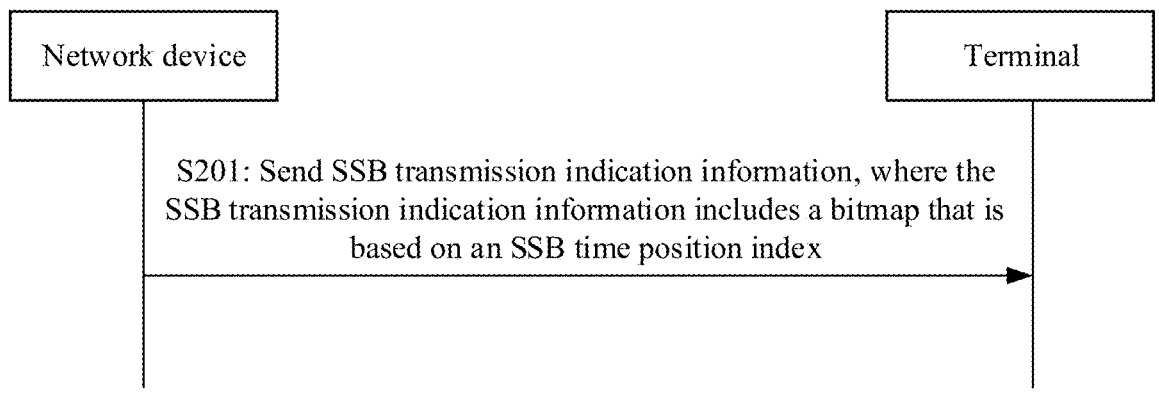
FIG. 3 is an interaction diagram of an SSB transmission indication method according to some embodiments of this disclosure.

FIG. 3 is an interaction diagram of an SSB transmission indication method according to some embodiments of this disclosure. As shown in FIG. 3, the SSB transmission indication method includes the following step:

S201: A network device sends SSB transmission indication information to a terminal, and the terminal receives the SSB transmission indication information, where the SSB transmission indication information includes a bitmap that is based on an SSB time position index, and a candidate time position in which an SSB can be transmitted is indicated by using the bitmap.

Each bit in the bitmap corresponds to an SSB time position index, a value of a bit in the bitmap includes a first value, and the first value indicates that a time position indicated by an index corresponding to the bit is a candidate time position in which an SSB can be transmitted. The value of the bit in the bitmap further includes a second value, and the second value indicates that the time position indicated by the index corresponding to the bit is a position in which an SSB is not transmitted.

For example, the value of the bit in the bitmap includes "1" and "0". "1" indicates that the time position indicated by the index corresponding to the bit is a candidate time position in which an SSB can be transmitted, and "0" indicates that the time position indicated by the index corresponding to the bit is a position in which an SSB is not transmitted. Actually, whether an SSB is transmitted in a candidate time position is determined based on information about listen before talk (LBT) success.

In some embodiments of this disclosure, the SSB transmission indication method may include: The terminal establishes a mapping relationship between a candidate time position and an RO based on a candidate time position indicated by the SSB transmission indication information.

A mapping between each candidate time position and an RO is established in an order of indexes of the candidate time positions, to obtain a mapping relationship between each candidate time position and an RO. Each candidate time position may be mapped to one or more ROs.

For example, the SSB transmission indication information indicates three candidate time positions: a candidate time position 1, a candidate time position 2, and a candidate time position 3. The three candidate time positions are sorted in an order of indexes of the candidate time positions, and a post-sorting order is: the candidate time position 2, the candidate time position 1, and the candidate time position 3. A mapping between the candidate time position 2 and an RO is first established, a mapping between the candidate time position 1 and an RO is then established, and a mapping between the candidate time position 3 and an RO is finally established.

In addition, the terminal may obtain quasi co-location (QCL) indexes of candidate SSBs that are to be transmitted in all candidate time positions. For all candidate SSBs with a same QCL index, ROs mapped to time positions of these candidate SSBs can be shared. For each candidate time position indicated by the SSB transmission indication information, an SSB that may be transmitted in the candidate time position is a candidate SSB.

There are two manners for obtaining a quasi co-location index of an SSB to be transmitted in a candidate time position.

Manner 1

A quasi co-location (QCL) index of an SSB corresponding to each candidate time position is obtained based on a time position index of the SSB and/or other configuration information. The other configuration information may include QCL modulus information and a quantity of search spaces configured for each slot.

Manner 2

A QCL index of an SSB corresponding to each candidate time position may be obtained based on a physical broadcast channel (PBCH) dedicated demodulation reference signals (DM-RS) identifier (ID) in the SSB and/or other configuration information. The other configuration information may include QCL modulus information and a quantity of search spaces configured for each slot.

After the mapping relationship is established, SSBs with a same quasi co-location index can share ROs. For example, a first SSB and a second SSB have a same quasi co-location index. If the terminal detects any one of the first SSB or the second SSB, the terminal sends a random access message at an RO mapped to a candidate time position of the first SSB and an RO mapped to a candidate time position of the second SSB.

Figure 4:
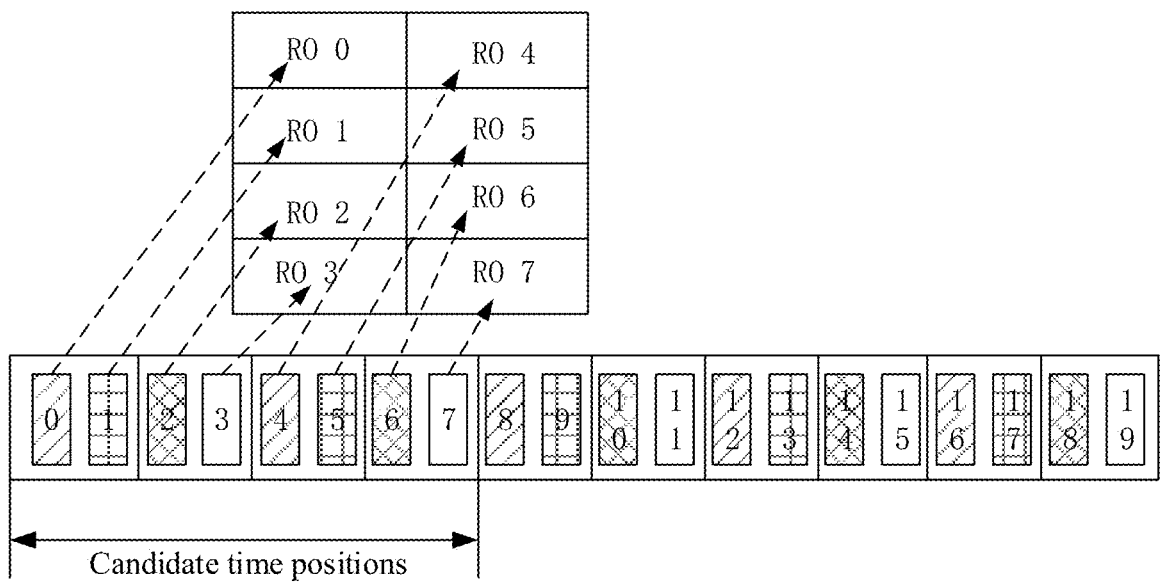
FIG. 4 is a schematic diagram of a principle of an SSB transmission indication method according to some embodiments of this disclosure.

For example, as shown in FIG. 4, it is assumed that there are totally 20 time positions, and the 20 time positions are numbered sequentially. The bitmap indicated by the SSB transmission indication information has 20 bits. The bitmap is 11111111000000000000. In other words, time positions indicated by indexes corresponding to first eight bits are candidate time positions in which an SSB can be transmitted. In an order of indexes of the candidate time positions, a mapping between a candidate time position 0 and an RO 0, a mapping between a candidate time position 1 and an RO 1, a mapping between a candidate time position 2 and an RO 2, and so on are established sequentially, until a mapping between a candidate time position 7 and an RO 7 is established.

It is assumed that SSBs to be transmitted within a period are SSBs in the candidate time positions 2, 3, 4, and 5. An RO corresponding to the SSB #2 is the RO 2, and an RO corresponding to the SSB #6 is the RO 6. Because the SSB #6 and the SSB #2 have a same QCL index, the ROs of the SSB #6 and the SSB #2 can be shared. Therefore, ROs that a terminal detecting the SSB #2 can use are the RO 2 and the RO 6.

In some embodiments of this disclosure, the SSB transmission indication method may include: The terminal performs, based on downlink transmission information, rate matching on the candidate time position indicated by the SSB transmission indication information, for example, performs, based on the downlink transmission information, rate matching on all candidate time positions indicated by the SSB transmission indication information.

The downlink transmission information includes at least one of the following: remaining minimum system information (RMSI), OSI, paging, RAR, or PDSCH.

In some embodiments of this disclosure, the SSB transmission indication method may include: For a physical downlink control channel PDCCH candidate, if at least one resource element RE of the PDCCH candidate overlaps a resource element of a candidate SSB, the terminal skips monitoring the PDCCH candidate, where the candidate SSB is an SSB that may be transmitted in the candidate time position indicated by the SSB transmission indication information.

For example, for a PDCCH candidate that is not in a type 0 PDCCH CSS set, if at least one resource element RE of the PDCCH candidate overlaps a resource element of all the candidate SSBs, the terminal does not monitor the PDCCH candidate. Actually, whether a candidate SSB is transmitted in a candidate time position is determined based on information about LBT success.

In some embodiments of this disclosure, the SSB transmission indication method may include: determining a slot used for PUCCH repetition transmission.

The slot used for PUCCH repetition transmission includes N consecutive flexible symbols starting from a first symbol, the N flexible symbols do not overlap the candidate time position indicated by the SSB transmission indication information, and N is a positive integer.

Alternatively, the slot used for PUCCH repetition transmission includes N consecutive configured uplink symbols starting from a first symbol.

There are two manners for obtaining the first symbol.

Manner 1

A start symbol specified during PUCCH configuration is a network-configured uplink symbol. The start symbol specified during PUCCH configuration is used as the first symbol.

Manner 2

A start symbol specified during PUCCH configuration is a flexible symbol that does not overlap all candidate time positions. The start symbol specified during PUCCH configuration is used as the first symbol.

Figure 5:
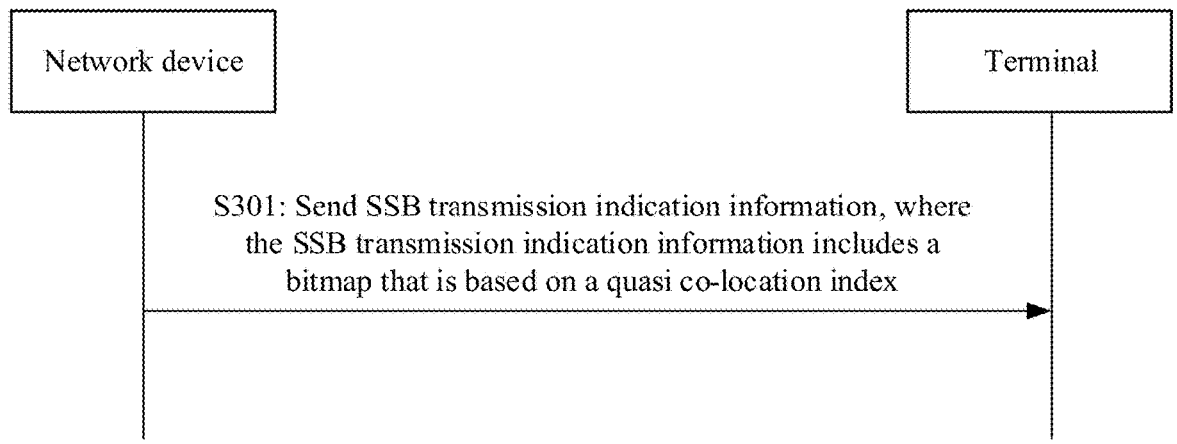
FIG. 5 is an interaction diagram of an SSB transmission indication method according to some embodiments of this disclosure.

FIG. 5 is an interaction diagram of an SSB transmission indication method according to some embodiments of this disclosure. As shown in FIG. 5, the SSB transmission indication method includes the following step:

S301: A network device sends SSB transmission indication information to a terminal, and the terminal receives the SSB transmission indication information, where the SSB transmission indication information includes a bitmap that is based on a quasi co-location index.

At least one group of candidate time positions is indicated by using the bitmap, and each group of candidate time positions is used for at least one SSB transmission. In other words, for any group of candidate time positions, at least one SSB transmission is performed in the group of candidate time positions.

The quasi co-location index is a quasi co-location index of an SSB.

A value of a bit in the bitmap includes a first value and/or a second value, the first value indicates that a group of time positions corresponding to the bit is a group of candidate time positions, and the second value indicates that a group of time positions corresponding to the bit is a group of time positions in which SSB transmission is not performed.

Each bit in the bitmap corresponds to a quasi co-location index, and each quasi co-location index corresponds to a group of time positions.

For example, the value of the bit in the bitmap includes "1" and "0". When a value of a bit is "1", the bit corresponds to a quasi co-location index, a group of time positions corresponding to the quasi co-location index is a group of candidate time positions, and at least one SSB transmission is performed in the group of candidate time positions. Even if LBT is successful in an SSB transmission window, an actual time position in which an SSB is transmitted is not determined. The actual time position in which the SSB is transmitted is determined based on information about LBT success. When a value of a bit is "0", the bit corresponds to a quasi co-location index, and a group of time positions corresponding to the quasi co-location index is a group of time positions in which SSB transmission is not performed.

If an SSB transmission window is configured, each group of candidate time positions indicated by the SSB transmission indication information is limited within the SSB transmission window; if no SSB transmission window is configured, an SSB transmission window is a maximum transmission window specified in a protocol.

In some embodiments of this disclosure, the SSB transmission indication method further includes: The terminal establishes a mapping.

That the terminal establishes a mapping includes: obtaining a mapping relationship between an RO and a group of candidate time positions based on each group of candidate time positions in the at least one group of candidate time positions indicated by the SSB transmission indication information.

A quantity of SSBs that are in SSBs to be transmitted and that are not quasi co-located mutually is obtained based on the SSB transmission indication information. A QCL parameter includes at least one of a parameter of type A/B/C/D or an average gain.

QCL type A 'QCL-TypeA': {Doppler shift, Doppler spread, average delay, delay spread};
'QCL-TypeB': {Doppler shift, Doppler spread};
'QCL-TypeC': {Doppler shift, average delay}; and
'QCL-TypeD': {Spatial Rx parameter}.

The quantity of the SSBs that are not quasi co-located mutually is used as a base of mappings that need to be performed. A quantity of ROs associated with each QCL index is configured. Based on the configuration, for each group of candidate time positions indicated by the SSB transmission indication information, a mapping between a group of candidate time positions and at least one RO is established, to obtain the mapping relationship between an RO and a group of candidate time positions.

The mapping is established in an order of quasi co-location indexes corresponding to the groups of candidate time positions. The mapping includes at least one round of mappings, each round of mappings includes X1 mappings of a single group of candidate time positions, and X1 is the quantity of the SSBs that are in the SSBs to be transmitted and that are not quasi co-located mutually. The SSBs to be transmitted are SSBs that may be transmitted in the candidate time positions indicated by the SSB transmission indication information.

Figure 6:
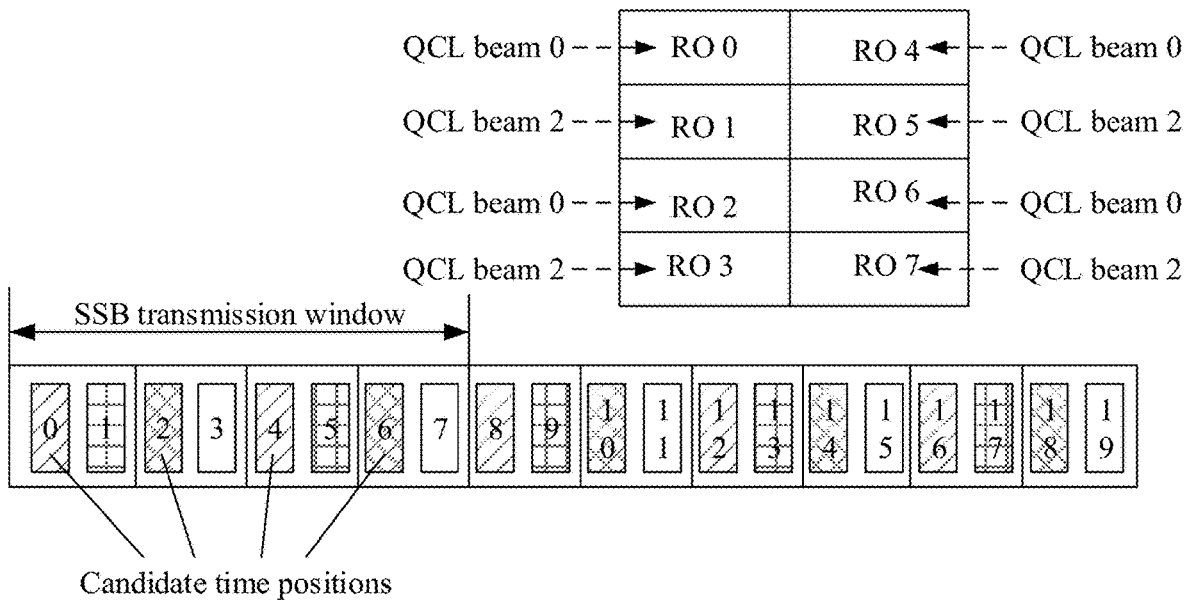
FIG. 6 is a schematic diagram of a principle of an SSB transmission indication method according to some embodiments of this disclosure.

For example, as shown in FIG. 6, there are totally 20 time positions in which an SSB is transmitted, and a maximum quantity of configurable QCL beam indexes is 8. Therefore, the bitmap has eight bits. In addition, a QCL modulus value configured in this example is 4, that is, the quantity of the SSBs that are not quasi co-located mutually is 4. If the bitmap is 10100000, it indicates that there are two groups of candidate time positions. A first group of candidate time positions includes 2, 6, 10, 14, and 18, and a second group of candidate time positions includes 0, 4, 8, 12, and 16. In FIG. 6, a QCL beam 0 represents the first group of candidate time positions, and a QCL beam 2 represents the second group of candidate time positions.

A mapping between the first group of candidate time positions and an RO 0 is established, a mapping between the second group of candidate time positions and an RO 1 is established, and in this case, a first mapping is established. A mapping between the first group of candidate time positions and an RO 2 is established, a mapping between the second group of candidate time positions and an RO 3 is established, and in this case, a second mapping is established. A mapping between the first group of candidate time positions and an RO 4 is established, a mapping between the second group of candidate time positions and an RO 5 is established, and in this case, a third mapping is established. A mapping between the first group of candidate time positions and an RO 6 is established, a mapping between the second group of candidate time positions and an RO 7 is established, and in this case, a fourth mapping is established.

Establishment of the four mappings is considered as establishment of one round of mappings. Then, establishment of next round of mappings is continued.

It can be learned from the foregoing description that in one round of mappings, the first group of candidate time positions has four mappings, and the second group of candidate time positions also has four mappings, that is, a quantity of mappings of a single group of candidate time positions is the quantity of the SSBs that are not quasi co-located mutually.

If the further configured SSB transmission window is 0-7, candidate time positions in the SSB transmission window are 0, 2, 4, and 6. It is assumed that time positions of SSBs to be transmitted within a period are 2 and 4. When the terminal detects the SSB #2, a QCL beam index corresponding to the SSB #2 is 0, and ROs corresponding to the QCL beam index 0 are the RO 0, the RO 2, the RO 4, and the RO 6.

In some embodiments of this disclosure, the SSB transmission indication method further includes: The terminal performs rate matching.

Rate matching includes: performing, based on downlink transmission information, rate matching on the at least one group of candidate time positions indicated by the SSB transmission indication information. The downlink transmission information includes at least one of the following: RMSI, OSI, paging, RAR, or PDSCH.

In some embodiments of this disclosure, the SSB transmission indication method further includes: The terminal performs PDCCH monitoring.

PDCCH monitoring includes: For a PDCCH candidate, if at least one RE of the PDCCH candidate overlaps an RE of a candidate SSB, the terminal does not need to monitor the PDCCH candidate.

The PDCCH candidate is a PDCCH candidate that is not in a type 0 PDCCH CSS set. The candidate SSB includes an SSB that may be transmitted in the at least one group of candidate time positions indicated by the SSB transmission indication information.

In some embodiments of this disclosure, the SSB transmission indication method further includes: The terminal performs PUCCH repetition transmission.

PUCCH repetition transmission includes: determining a slot used for PUCCH repetition transmission.

The slot used for PUCCH repetition transmission includes N consecutive flexible symbols starting from a first symbol, the N flexible symbols do not overlap the candidate time position indicated by the SSB transmission indication information, and N is a positive integer.

Optionally, the N flexible symbols do not overlap all groups of candidate time positions indicated by the SSB transmission indication information.

Alternatively, the slot used for PUCCH repetition transmission includes N consecutive uplink symbols starting from the first symbol.

There are two manners for obtaining the first symbol.

Manner 1

A start symbol specified during PUCCH configuration is a network-configured uplink symbol. The start symbol specified during PUCCH configuration is used as the first symbol.

Manner 2

A start symbol specified during PUCCH configuration is a flexible symbol that does not overlap all the groups of candidate time positions. The start symbol specified during PUCCH configuration is used as the first symbol.

Figure 7:
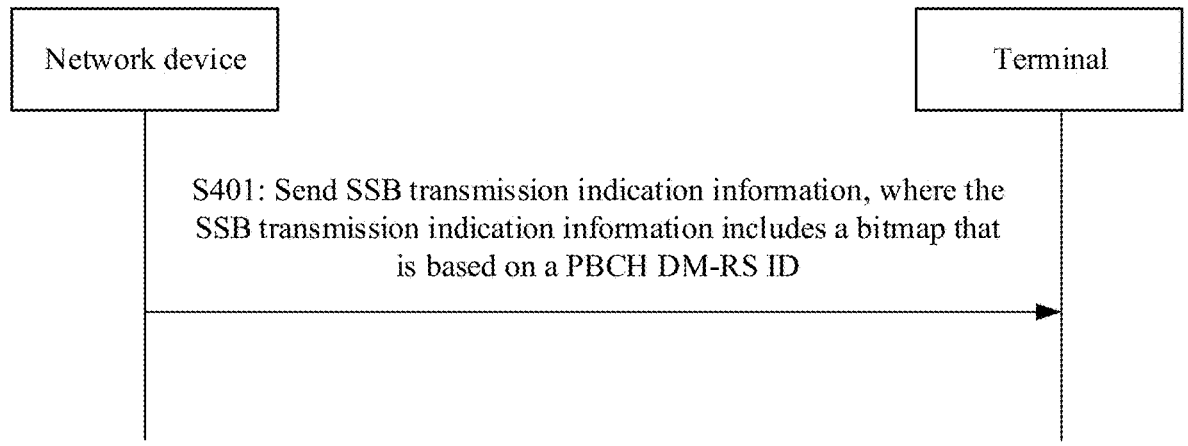
FIG. 7 is an interaction diagram of an SSB transmission indication method according to some embodiments of this disclosure.

FIG. 7 is an interaction diagram of an SSB transmission indication method according to some embodiments of this disclosure. As shown in FIG. 7, the SSB transmission indication method includes the following step:

S401: A network device sends SSB transmission indication information to a terminal, and the terminal receives the SSB transmission indication information, where the SSB transmission indication information includes a bitmap that is based on a PBCH DM-RS ID.

At least one group of candidate time positions is indicated by using the bitmap, and each group of candidate time positions is used for at least one SSB transmission. In other words, for any group of candidate time positions, at least one SSB transmission is performed in the group of candidate time positions.

A value of a bit in the bitmap includes a first value and/or a second value, the first value indicates that a group of time positions corresponding to the bit is a group of candidate time positions, and the second value indicates that a group of time positions corresponding to the bit is a group of time positions in which SSB transmission is not performed.

Each bit in the bitmap corresponds to a PBCH DM-RS ID, and each PBCH DM-RS ID corresponds to a group of time positions. For example, the value of the bit in the bitmap includes "1" and "0". When a value of a bit is "1", the bit corresponds to a PBCH DM-RS ID, a group of time positions corresponding to the PBCH DM-RS ID is a group of candidate time positions, and at least one SSB transmission is performed in the group of candidate time positions. Even if LBT is successful in an SSB transmission window, an actual time position in which an SSB is transmitted is not determined. The actual time position in which the SSB is transmitted is determined based on information about LBT success. When a value of a bit is "0", the bit corresponds to a PBCH DM-RS ID, and a group of time positions corresponding to the PBCH DM-RS ID is a group of time positions in which SSB transmission is not performed.

If an SSB transmission window is configured, each group of candidate time positions indicated by the SSB transmission indication information is limited within the SSB transmission window; if no SSB transmission window is configured, an SSB transmission window is a maximum transmission window specified in a protocol.

In some embodiments of this disclosure, the SSB transmission indication method further includes: The terminal establishes a mapping.

That the terminal establishes a mapping includes: obtaining a mapping relationship between an RO and a group of candidate time positions based on each group of candidate time positions in the at least one group of candidate time positions indicated by the SSB transmission indication information.

A quantity of transmitted PBCH DM-RS IDs is obtained based on the SSB transmission indication information, and the quantity is used as a base N of mappings that need to be performed. A quantity of ROs associated with each PBCH DM-RS ID is configured. Based on the configuration, for each group of candidate time positions indicated by the SSB transmission indication information, a mapping between a group of candidate time positions and at least one RO is established, to obtain the mapping relationship between an RO and a group of candidate time positions.

The mapping is established in an order of PBCH DM-RS IDs corresponding to the groups of candidate time positions. The mapping includes at least one round of mappings, each round of mappings includes X2 mappings of a single group of candidate time positions, and X2 is a quantity of PBCH DM-RS IDs.

A mapping manner in some embodiments of this disclosure is the same as a mapping manner in the embodiment shown in FIG. 5, and a difference lies in that there are X1 mappings in each round in the embodiment shown in FIG. 5, and there are X2 mappings in each round in some embodiments of this disclosure. Because the mapping manner is described in detail in the embodiment shown in FIG. 5, details are not described herein again.

In some embodiments of this disclosure, the SSB transmission indication method further includes one or more of the following: the terminal performing rate matching, the terminal performing PDCCH monitoring, and the terminal performing PUCCH repetition transmission.

Because rate matching, PDCCH monitoring, and PUCCH repetition transmission in this embodiment are the same as rate matching, PDCCH monitoring, and PUCCH repetition transmission in the embodiment shown in FIG. 5, and rate matching, PDCCH monitoring, and PUCCH repetition transmission are described in detail in the embodiment shown in FIG. 5, details are not described herein again.

Figure 8:
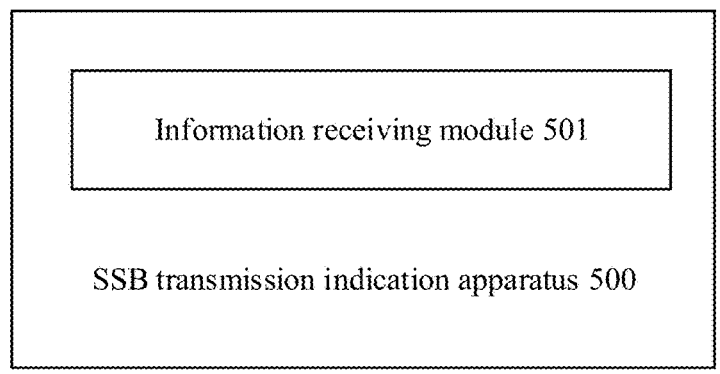
FIG. 8 is a block diagram of an SSB transmission indication apparatus according to some embodiments of this disclosure.

FIG. 8 is a block diagram of an SSB transmission indication apparatus according to some embodiments of this disclosure. The SSB transmission indication apparatus is applied to a terminal. As shown in FIG. 8, the SSB transmission indication apparatus 500 includes:

an information receiving module 501, configured to receive SSB transmission indication information, where the SSB transmission indication information is used to indicate a candidate time position of an SSB.

In an embodiment of this disclosure, the SSB transmission indication apparatus 500 further includes:

a first mapping establishment module, configured to obtain a mapping relationship between a candidate time position and an RO based on each candidate time position indicated by the SSB transmission indication information.

In an embodiment of this disclosure, the SSB transmission indication apparatus 500 further includes:

an RO obtaining module, configured to: if any one of a first SSB or a second SSB is detected, obtain, based on the mapping relationship, an RO mapped to the first SSB and an RO mapped to the second SSB, where the first SSB and the second SSB have a same quasi co-location index; and a random access message sending module, configured to send a random access message at the RO mapped to a candidate time position of the first SSB and the RO mapped to a candidate time position of the second SSB.

In an embodiment of this disclosure, the SSB transmission indication apparatus 500 further includes:

a second mapping establishment module, configured to obtain a mapping relationship between an RO and a group of candidate time positions based on each group of candidate time positions in at least one group of candidate time positions.

In an embodiment of this disclosure, the SSB transmission indication apparatus 500 further includes:

a rate matching module, configured to perform, based on downlink transmission information, rate matching on the candidate time position indicated by the SSB transmission indication information.

In an embodiment of this disclosure, the SSB transmission indication apparatus 500 further includes:

a monitoring module, configured to: for a physical downlink control channel PDCCH candidate, if at least one resource element RE of the PDCCH candidate overlaps a resource element of a candidate SSB, skip monitoring the PDCCH candidate, where the candidate SSB is an SSB that may be transmitted in the candidate time position indicated by the SSB transmission indication information.

In an embodiment of this disclosure, the SSB transmission indication apparatus 500 further includes:

a slot determining module, configured to determine a slot used for PUCCH repetition transmission, where the slot used for PUCCH repetition transmission includes N consecutive flexible symbols starting from a first symbol, the N flexible symbols do not overlap the candidate time position indicated by the SSB transmission indication information, and N is a positive integer.

Figure 9:
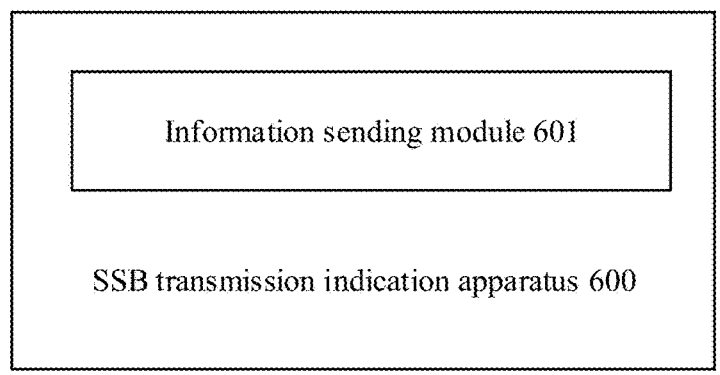
FIG. 9 is a block diagram of another SSB transmission indication apparatus according to some embodiments of this disclosure.

FIG. 9 is a block diagram of another SSB transmission indication apparatus according to some embodiments of this disclosure. The SSB transmission indication apparatus is applied to a network device. As shown in FIG. 9, the SSB transmission indication apparatus 600 includes:

an information sending module 601, configured to send SSB transmission indication information, where the SSB transmission indication information is used to indicate a candidate time position of an SSB.

Figure 10:
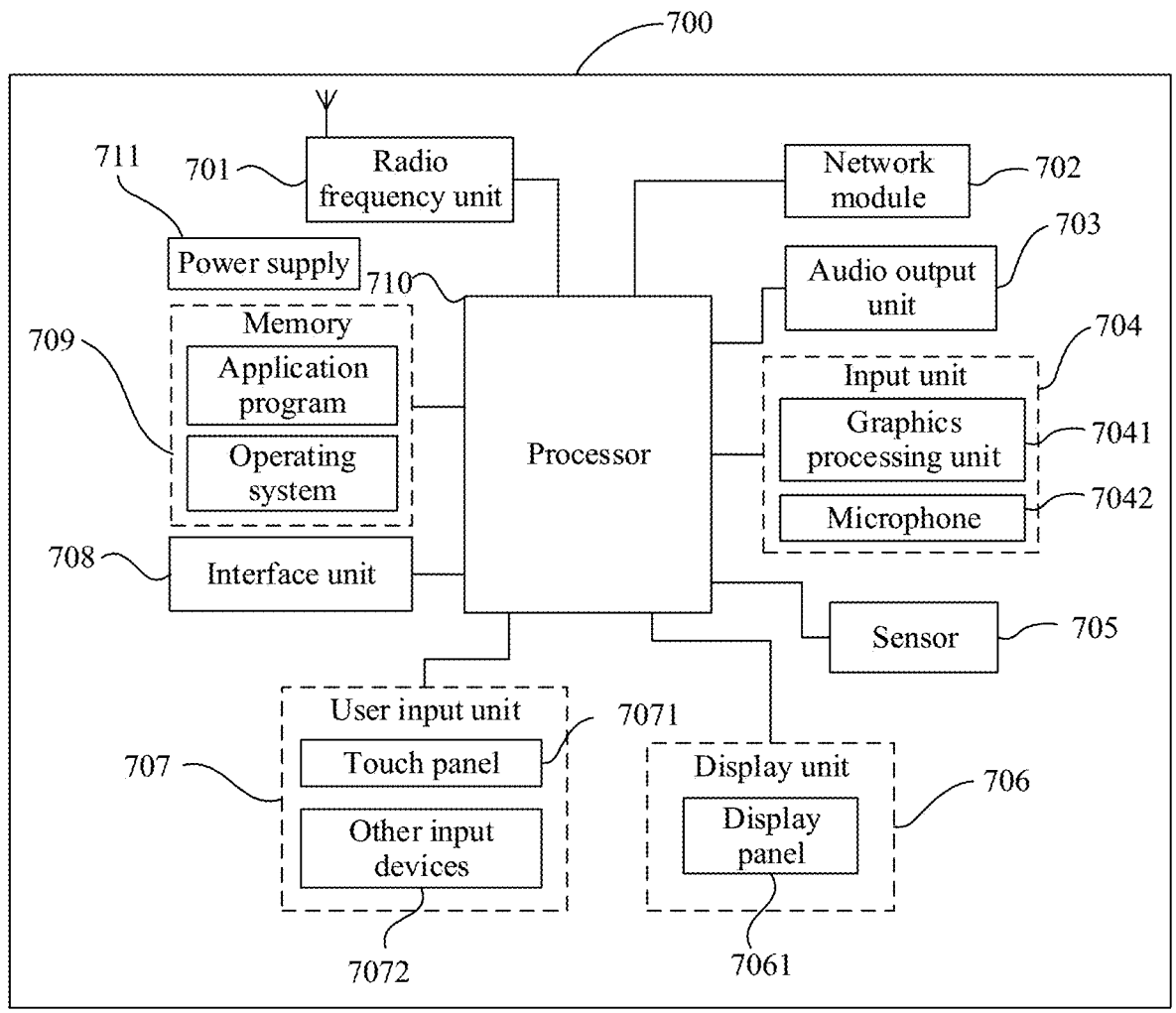
FIG. 10 is a schematic diagram of a hardware structure of a terminal implementing some embodiments of this disclosure.

FIG. 10 is a schematic diagram of a hardware structure of a terminal implementing some embodiments of this disclosure.

The terminal 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that the structure of the terminal shown in FIG. 10 does not constitute a limitation on the terminal. The terminal may include more or fewer components than those shown in the figure, or some components are combined, or component arrangements are different. In some embodiments of this disclosure, the terminal includes but is not limited to a mobile phone, a tablet computer, a laptop computer, a palmtop computer, an in-vehicle terminal, a wearable device, a pedometer, and the like.

The radio frequency unit 701 is configured to receive SSB transmission indication information, where the SSB transmission indication information is used to indicate a candidate time position of an SSB.

It should be understood that, in some embodiments of this disclosure, the radio frequency unit 701 may be configured to receive and send a signal in an information sending/receiving or call process. Specifically, the radio frequency unit 701 receives downlink data from a base station and then sends the downlink data to the processor 710 for processing; and sends uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with a network and another device through a wireless communications system.

The terminal provides the user with wireless broadband Internet access by using the network module 702, for example, helps the user send or receive an email, browse a web page, access streaming media, and the like.

The audio output unit 703 may convert audio data received by the radio frequency unit 701 or the network module 702 or stored in the memory 709 into an audio signal and output the audio signal as a sound. In addition, the audio output unit 703 may further provide audio output (for example, a call signal reception tone or a message reception tone) that is related to a specific function performed by the terminal 700. The audio output unit 703 includes a speaker, a buzzer, a telephone receiver, and the like.

The input unit 704 is configured to receive an audio or video signal. The input unit 704 may include a graphics processing unit (GPU) 7041 and a microphone 7042. The graphics processing unit 7041 processes image data of a static picture or a video that is obtained by an image capture apparatus (for example, a camera) in a video capture mode or an image capture mode. A processed image frame may be displayed on the display unit 706. An image frame processed by the graphics processing unit 7041 may be stored in the memory 709 (or another storage medium) or sent by the radio frequency unit 701 or the network module 702. The microphone 7042 can receive a sound and can process the sound into audio data. The processed audio data can be converted, for outputting, into a format that can be sent to a mobile communication base station through the radio frequency unit 701 in a telephone call mode.

The terminal 700 further includes at least one sensor 705, for example, an optical sensor, a motion sensor, and other sensors. Specifically, the optical sensor includes an ambient light sensor and a proximity sensor. The ambient light sensor may adjust brightness of a display panel 7061 based on intensity of ambient light. When the terminal 700 moves near an ear, the proximity sensor may disable the display panel 7061 and/or backlight. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as a pedometer and tapping), and the like. The sensor 705 may also include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information input by the user or information provided for the user. The display unit 706 may include the display panel 7061. The display panel 7061 may be configured in a form of a liquid crystal display (LCD), an organic light-emitting diode (OLED), or the like.

The user input unit 707 may be configured to receive input digit or character information, and generate key signal input that is related to user setting and function control of the terminal. Specifically, the user input unit 707 includes a touch panel 7071 and other input devices 7072. The touch panel 7071 is also referred to as a touchscreen, and may collect a touch operation of the user on or near the touch panel 7071 (for example, an operation performed on or near the touch panel 7071 by the user by using any appropriate object or accessory such as a finger or a stylus). The touch panel 7071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 710, and receives and executes a command sent by the processor 710. In addition, the touch panel 7071 may be implemented in a plurality of forms, for example, as a resistive, capacitive, infrared, or surface acoustic wave touch panel. The user input unit 707 may further include other input devices 7072 in addition to the touch panel 7071. Specifically, the other input devices 7072 may include but are not limited to a physical keyboard, a function key (such as a volume control key or an on/off key), a trackball, a mouse, and a joystick. Details are not described herein.

Further, the touch panel 7071 may cover the display panel 7061. After detecting a touch operation on or near the touch panel 7071, the touch panel 7071 transmits the touch operation to the processor 710 to determine a type of a touch event. Then the processor 710 provides corresponding visual output on the display panel 7061 based on the type of the touch event. Although the touch panel 7071 and the display panel 7061 are used as two separate components to implement input and output functions of the terminal in FIG. 10, the touch panel 7071 and the display panel 7061 may be integrated to implement the input and output functions of the terminal in some embodiments. This is not specifically limited herein.

The interface unit 708 is an interface for connecting an external apparatus to the terminal 700. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 708 may be configured to receive input (for example, data information and electric power) from the external apparatus, and transmit the received input to one or more elements in the terminal 700; or may be configured to transmit data between the terminal 700 and the external apparatus.

The memory 709 may be configured to store a software program and various data. The memory 709 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 709 may include a high-speed random access memory, or may include a non-volatile memory, for example, at least one magnetic disk storage device, a flash memory device, or other volatile solid-state storage devices.

The processor 710 is a control center of the terminal, and is connected to all components of the terminal by using various interfaces and lines. By running or executing a software program and/or a module stored in the memory 709 and invoking data stored in the memory 709, the processor 710 executes various functions of the terminal and processes data, so as to perform overall monitoring on the terminal. The processor 710 may include one or more processing units. Optionally, the processor 710 may integrate an application processor and a modem processor. The application processor mainly processes an operating system, a user interface, an application program, and the like. The modem processor mainly processes wireless communication. It may be understood that the modem processor may alternatively not be integrated into the processor 710.

The terminal 700 may further include a power supply 711 (for example, a battery) that supplies power to the components. Optionally, the power supply 711 may be logically connected to the processor 710 by using a power management system, so as to implement functions such as charging management, discharging management, and power consumption management by using the power management system.

In addition, the terminal 700 includes some functional modules that are not shown. Details are not described herein.

Some embodiments of this disclosure further provides a terminal, including a processor, a memory, and a computer program stored in the memory and capable of running on the processor. When the computer program is executed by the processor, the processes of the foregoing SSB transmission indication method embodiment are implemented, and a same technical effect can be achieved. To avoid repetition, details are not described herein again.

Some embodiments of this disclosure further provides a network device, including a processor, a memory, and a computer program stored in the memory and capable of running on the processor. When the computer program is executed by the processor, the processes of the foregoing SSB transmission indication method embodiment are implemented, and a same technical effect can be achieved. To avoid repetition, details are not described herein again.

Some embodiments of this disclosure further provide a computer-readable storage medium, where the computer-readable storage medium stores a computer program. When the computer program is executed by a processor, the processes of the foregoing SSB transmission indication method are implemented, and a same technical effect can be achieved. To avoid repetition, details are not described herein again. The computer-readable storage medium is, for example, a read-only memory (ROM), a random access memory (RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable medium. Based on such an understanding, the technical solutions of this disclosure essentially, or the part contributing to related technologies, or some of the technical solutions may be embodied in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The foregoing storage medium may be a magnetic disk, an optical disc, a read-only memory (ROM), a random access memory (RAM), or the like.

It can be understood that the embodiments described in this disclosure may be implemented by hardware, software, firmware, middleware, microcode, or a combination thereof. For hardware implementation, the modules, units, and sub-units may be implemented in one or more application-specific integrated circuits (ASICs), digital signal processors (DSPs), digital signal processing devices (DSPDs), programmable logic devices (PLDs), field-programmable gate arrays (FPGAs), general-purpose processors, controllers, microcontrollers, microprocessors, and other electronic units for performing the functions described in this disclosure, or a combination thereof.

For software implementation, the techniques described in some embodiments of this disclosure may be implemented by modules (for example, processes and functions) that perform the functions described in some embodiments of this disclosure. Software code may be stored in the memory and executed by the processor. The memory may be implemented in or outside the processor.

The embodiments of this disclosure are described above with reference to the accompanying drawings, but this disclosure is not limited to the foregoing implementations.

The foregoing embodiments are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A synchronization signal/physical broadcast channel block (SSB) transmission indication method, applied to a terminal and comprising:
receiving SSB transmission indication information, wherein the SSB transmission indication information is used to indicate a candidate time position of an SSB,
wherein the SSB transmission indication information is used to indicate at least one group of candidate time positions, and each group of candidate time positions is used for at least one SSB transmission,
wherein the SSB transmission indication information comprises a bitmap, a value of a bit in the bitmap comprises a first value and/or a second value, the first value indicates that a group of time positions corresponding to the bit is a group of candidate time positions, and the second value indicates that a group of time positions corresponding to the bit is a group of time positions in which SSB transmission is not performed, wherein the first value is 1, and the second value is 0,
wherein each bit in the bitmap corresponds to a quasi co-location index, and each quasi co-location index corresponds to a group of time positions,
wherein the method further comprises:
obtaining a mapping relationship between a random access channel occasion (RO) and a group of candidate time positions based on each group of candidate time positions in the at least one group of candidate time positions;
wherein if an SSB transmission window is configured, each group of candidate time positions indicated by the SSB transmission indication information is limited within the SSB transmission window; if no SSB transmission window is configured, an SSB transmission window is a maximum transmission window specified in a protocol.

2. The method according to claim 1, further comprising:
performing, based on downlink transmission information, rate matching on the candidate time position indicated by the SSB transmission indication information.

3. The method according to claim 1, further comprising:
for a physical downlink control channel (PDCCH) candidate, if at least one resource element (RE) of the PDCCH candidate overlaps a resource element of a candidate SSB, skipping monitoring the PDCCH candidate, wherein the candidate SSB is an SSB that may be transmitted in the candidate time position indicated by the SSB transmission indication information.

4. The method according to claim 1, further comprising:
determining a slot used for physical uplink control channel (PUCCH) repetition transmission, wherein
the slot used for PUCCH repetition transmission comprises N consecutive flexible symbols starting from a first symbol, the N flexible symbols do not overlap the candidate time position indicated by the SSB transmission indication information, and N is a positive integer.

5. The method according to claim 1, wherein the mapping relationship is obtained based on an order of quasi co-location indexes corresponding to the groups of candidate time positions.

6. The method according to claim 1, wherein
the mapping comprises at least one round of mappings, each round of mappings comprises X1 mappings of a single group of candidate time positions, and X1 is a quantity of SSBs that are in SSBs to be transmitted and that are not quasi co-located mutually.

7. A synchronization signal/physical broadcast channel block (SSB) transmission indication method, applied to a network device and comprising:
sending SSB transmission indication information, wherein the SSB transmission indication information is used to indicate a candidate time position of an SSB,
wherein the SSB transmission indication information is used to indicate at least one group of candidate time positions, and each group of candidate time positions is used for at least one SSB transmission,
wherein the SSB transmission indication information comprises a bitmap, a value of a bit in the bitmap comprises a first value and/or a second value, the first value indicates that a group of time positions corresponding to the bit is a group of candidate time positions, and the second value indicates that a group of time positions corresponding to the bit is a group of time positions in which SSB transmission is not performed,
wherein each bit in the bitmap corresponds to a quasi co-location index, and each quasi co-location index corresponds to a group of time positions,
wherein there is a mapping relationship between a random access channel occasion (RO) and a group of candidate time positions;
if an SSB transmission window is configured, each group of candidate time positions indicated by the SSB transmission indication information is limited within the SSB transmission window; if no SSB transmission window is configured, an SSB transmission window is a maximum transmission window specified in a protocol.

8. The method according to claim 7, wherein the mapping relationship is obtained based on an order of quasi co-location indexes corresponding to the groups of candidate time positions.

9. The method according to claim 7, wherein
the mapping comprises at least one round of mappings, each round of mappings comprises X1 mappings of a single group of candidate time positions, and X1 is a quantity of SSBs that are in SSBs to be transmitted and that are not quasi co-located mutually.

10. A network device, comprising a processor, a memory, and a computer program stored in the memory and used to be executed by the processor, wherein when the computer program is executed by the processor, a following step is implemented:
sending synchronization signal/physical broadcast channel block (SSB) transmission indication information, wherein the SSB transmission indication information is used to indicate a candidate time position of an SSB,
wherein the SSB transmission indication information is used to indicate at least one group of candidate time positions, and each group of candidate time positions is used for at least one SSB transmission,
wherein the SSB transmission indication information comprises a bitmap, a value of a bit in the bitmap comprises a first value and/or a second value, the first value indicates that a group of time positions corresponding to the bit is a group of candidate time positions, and the second value indicates that a group of time positions corresponding to the bit is a group of time positions in which SSB transmission is not performed, wherein each bit in the bitmap corresponds to a quasi co-location index, and each quasi co-location index corresponds to a group of time positions, wherein there is a mapping relationship between a random access channel occasion (RO) and a group of candidate time positions;

if an SSB transmission window is configured, each group of candidate time positions indicated by the SSB transmission indication information is limited within the SSB transmission window; if no SSB transmission window is configured, an SSB transmission window is a maximum transmission window specified in a protocol.

11. The network device according to claim 10, wherein the mapping relationship is obtained based on an order of quasi co-location indexes corresponding to the groups of candidate time positions.

12. The network device according to claim 10, wherein the mapping comprises at least one round of mappings, each round of mappings comprises X1 mappings of a single group of candidate time positions, and X1 is a quantity of SSBs that are in SSBs to be transmitted and that are not quasi co-located mutually.

* * * * *